United States Patent
Hendriks et al.

(10) Patent No.: US 11,257,213 B2
(45) Date of Patent: Feb. 22, 2022

(54) TUMOR BOUNDARY RECONSTRUCTION USING HYPERSPECTRAL IMAGING

(71) Applicant: KONINKLIJKE PHILIPS N.V., Eindhoven (NL)

(72) Inventors: Bernardus Hendrikus Wilhelmus Hendriks, Eindhoven (NL); Hong Liu, Helmond (NL); Caifeng Shan, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 191 days.

(21) Appl. No.: 16/661,488

(22) Filed: Oct. 23, 2019

(65) Prior Publication Data

US 2020/0134820 A1 Apr. 30, 2020

(30) Foreign Application Priority Data

Oct. 25, 2018 (EP) .................................... 18202502
Mar. 26, 2019 (EP) .................................... 19165137

(51) Int. Cl.
*G06K 9/00* (2006.01)
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10036* (2013.01);
(Continued)

(58) Field of Classification Search
CPC ..... G06T 7/0012; G06T 7/11; G06T 2210/12; G06T 2207/20084; G06T 2207/10036;
(Continued)

(56) References Cited

U.S. PATENT DOCUMENTS

2007/0038042 A1* 2/2007 Freeman .............. A61B 5/0075 600/310
2016/0110584 A1* 4/2016 Remiszewski ........ G06T 7/0014 382/133
(Continued)

FOREIGN PATENT DOCUMENTS

WO 2018059662 A1 4/2018
WO 2018095516 A1 5/2018

OTHER PUBLICATIONS

Haokui Zhang et al: "Spectral-spatial classification of hyperspectral imagery using a dual-channel convolutional neural network", Remote Sensing Letters, vol. 8, No. 5, May 4, 2017 (May 4, 2017), pp. 438-447. (Year: 2017).*

(Continued)

*Primary Examiner* — Van D Huynh

(57) ABSTRACT

In a computer implemented method of determining a boundary of a tumor region or other diseased tissue, hyper- or multispectral image data of a tissue sample including a tumor region or other diseased tissue is taken. The analysis includes a morphological analysis and a spectral analysis of the hyper- or multispectral image data resulting in a morphological tumor boundary and a spectral tumor boundary or a morphological diseased tissue boundary and a spectral diseased tissue boundary. These two boundaries are combined resulting in a combined tumor boundary or combined diseased tissue boundary, wherein an indication of reliability of the combined tumor boundary or combined diseased tissue boundary is given.

20 Claims, 10 Drawing Sheets

(52) U.S. Cl.
CPC ........... *G06T 2207/20084* (2013.01); *G06T 2207/30096* (2013.01); *G06T 2210/12* (2013.01)

(58) Field of Classification Search
CPC . G06T 2207/30096; G06T 7/12; G06T 7/174; G06T 2207/20081
USPC ......................................................... 382/128
See application file for complete search history.

(56) References Cited

U.S. PATENT DOCUMENTS

2018/0180537 A1* 6/2018 Diem ..................... G16Z 99/00
2019/0279362 A1* 9/2019 Marrero Callico ... G06T 7/0012

OTHER PUBLICATIONS

Fabelo et al: "Spatio-Spectral Classification of Hyperspectral Images for Brain Cancer Detection During Surgical Operations"; PLOS One, Mar. 2018, pp. 1/27-27/27 (Year: 2018).*

Fabelo et al: "Spatio-Spectral Classification of Hyperspectral Images for Brain Cancer Detection During Surgical Operations"; PLOS One, Mar. 2018, pp. 1/27-27/27.
Fei et al: "Tumor Margin Assessment of Surgical Tissue Specimen of Cancer Patients Using Label-Free Hyperspectral Imaging"; Proc SPIE in Soc Opt Eng. 2017, pp. 1-12.
Goetz et al: "Three Decades of Hyperspectral Remote Sensing of the Earth: A Personal View"; Remote Sensing of Environment 113 (2009), pp. S5-S-16.
Halicek et al: "Deep Convolutional Neural Networks for Classifying Head and Neck Cancer Using Hyperspectral Imaging"; Journal of Biomedical Optics, vol. 22, vol. 6, pp. 060503-1-060503-4, Jun. 2017.
Fei et al: "Label-Free Reflectance Hyperspectral Imaging for Tumor Margin Assessment: A Pilot Study on Surgical Specimens of Cancer Patients"; J. Biomed. Opt. 22 (8), 2017, pp. 086009-1-086009-7.
Lu et al : "Medical Hyperspectral Imaging: A Review"; Journal of Biomedical Optics 19 (1), Jan. 2014, pp. 010901-1-010901-23.
Ma et al: "Deep Learning Based Classification for Head and Neck Cancer Detection With Hyperspectral Imaging in an Animal Model"; Proc SPIE in Soc Opt Eng, Feb. 2017, 13 Page Document.
Pike et al: "A Minimum Spanning Forest Based Method for Non-invasive Cancer Detection With Hyperspectral Imaging"; IEEE Trans Biomed Eng, Mar. 2016, vol. 63(3), pp. 653-663.

* cited by examiner

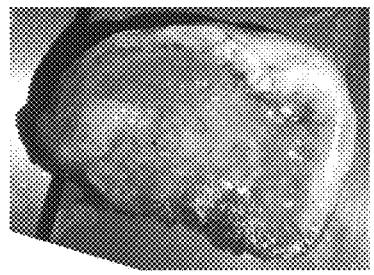 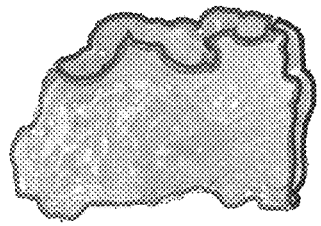 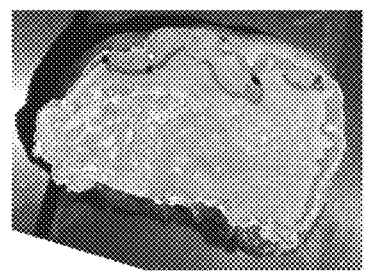
Fig. 3A          Fig. 3B          Fig. 3C
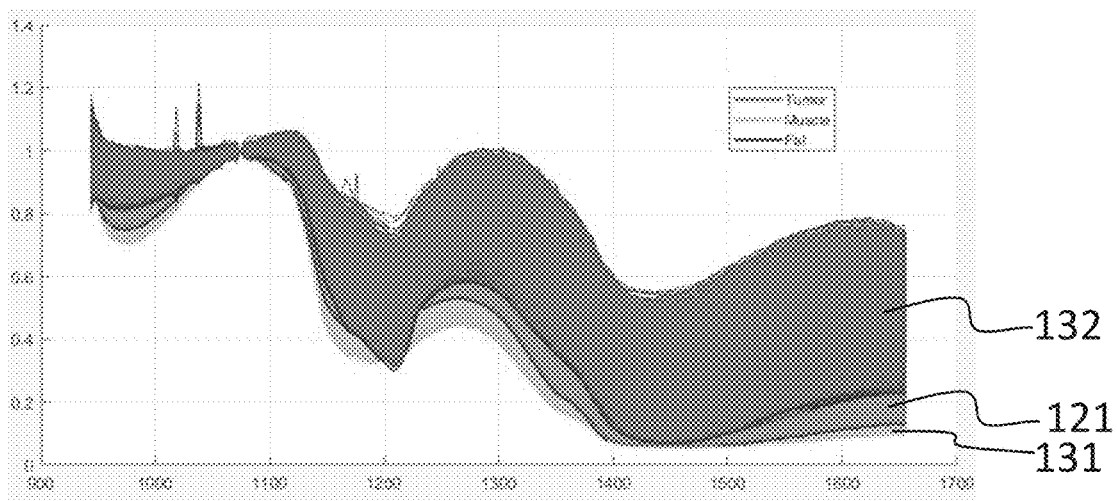
Fig. 4

```
12x1 Layer array with layers:

1   'imageinput'      Image Input            1x218x1 images with 'zerocenter' normalization
    2   'conv_1'          Convolution            30 1x25x1 convolutions with stride [1  1] and padding [0  0]
    3   'relu_1'          ReLU                   ReLU
    4   'maxpool_1'       Max Pooling            1x2 max pooling with stride [1  2] and padding [0  0]
    5   'conv_2'          Convolution            60 1x13x30 convolutions with stride [1  1] and padding [0  0]
    6   'relu_2'          ReLU                   ReLU
    7   'maxpool_2'       Max Pooling            1x2 max pooling with stride [1  2] and padding [0  0]
    8   'fc_1'            Fully Connected        4 fully connected layer
    9   'dropout'         Dropout                50% dropout
   10   'fc_2'            Fully Connected        2 fully connected layer
   11   'softmax'         Softmax                softmax
   12   'classoutput'     Classification Output  crossentropyex with classes '0' and '1'
```

Fig. 5

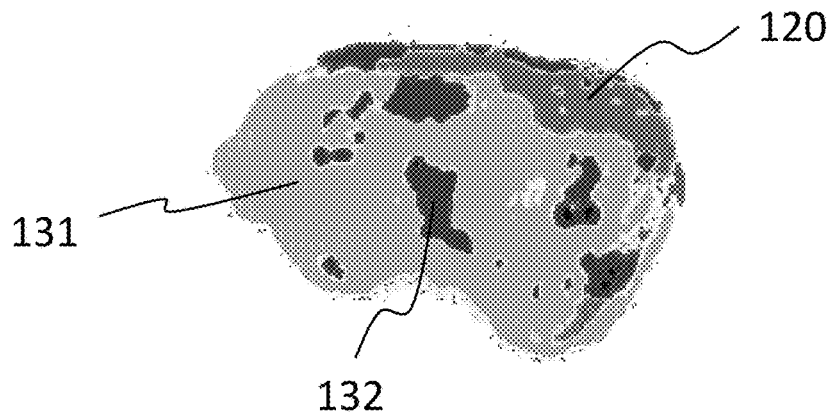

Fig. 6

| Patient | 1 | 2 | 3 | 4 | 5 | 6 | 7 | % |
|---|---|---|---|---|---|---|---|---|
| Total | 498 | 148 | 861 | 247 | 181 | 176 | 146 | 100 |
| Tumor | 40 | 6 | 116 | 32 | 13 | 5 | 13 | 9.4 |
| Muscle | 34 | 48 | 71 | 45 | 56 | 70 | 42 | 17.1 |

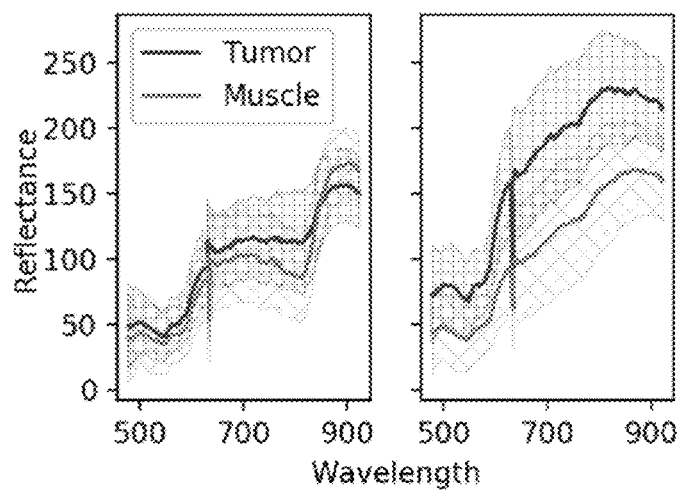
Fig. 15
| Patient | AUC | Accuracy | Sensitivity | Specificity |
|---|---|---|---|---|
| 1 | 0.933 | 0.789 | 0.974 | 0.605 |
| 2 | 0.787 | 0.746 | 0.615 | 0.876 |
| 3 | 0.891 | 0.636 | 0.938 | 0.335 |
| 4 | 0.926 | 0.840 | 0.922 | 0.758 |
| 5 | 0.913 | 0.843 | 0.924 | 0.763 |
| 6 | 0.910 | 0.807 | 0.733 | 0.880 |
| 7 | 0.970 | 0.922 | 0.941 | 0.903 |
| Mean | 0.904 | 0.798 | 0.864 | 0.731 |
| Stdev | 0.053 | 0.083 | 0.125 | 0.188 |
Fig. 16
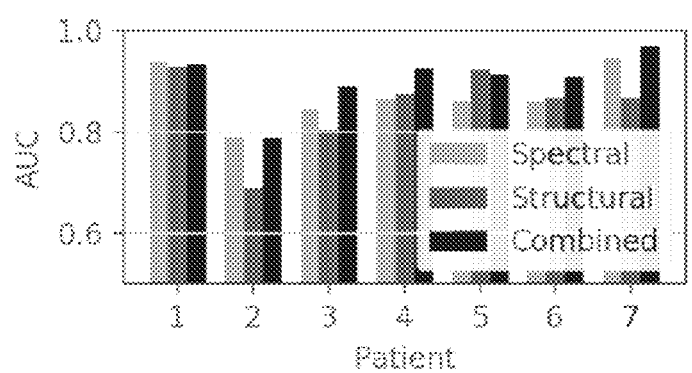
Fig. 17

TUMOR BOUNDARY RECONSTRUCTION USING HYPERSPECTRAL IMAGING

FIELD OF THE INVENTION

The present invention relates to a computer implemented method of determining a boundary of a tumor region or other diseased tissue, a computer program product comprising instructions which when executed on a processor cause the processor to carry out a method of determining a boundary of a tumor region or other diseased tissue, and an apparatus for determining a boundary of a tumor region or other diseased tissue.

BACKGROUND OF THE INVENTION

For the physician, knowing the diseased tissue boundary is important since the treatment depends heavily on it. Knowing where to cut and what critical tissues can be spared is very important for a good surgical outcome and for low comorbidity.

Surgical removal of breast tumors (e.g. lumpectomy) is one of the most frequently performed surgical resections with significant rate increase, due to the leading incidence and prevalence of the breast neoplasms. The clinical goal of the breast surgery is to remove the tumorous tissue entirely without leaving behind more than focally positive margins. Any trace of tumorous tissue left behind would potentially cause tumor recurrence and subsequent revision surgery. Radiotherapy is another treatment option where small microscopic portions left behind are treated by ionizing radiation.

A typical workflow for breast tumor resection is as follows: the procedure starts with the inspection of the 2D images to make the excision plan. In case of non-palpable tumors or when patients are treated with neoadjuvant chemotherapy a marker is placed in the tumor for guidance during surgery. During surgery, blue dye is typically injected to locate nearby lymph nodes that are inspected for the presence of tumor cells. The breast tumor is resected and visually inspected whether the resection is complete. The gold standard analysis of whether the resection is complete is typically performed by pathological analysis and may take two days.

Even though various pre-operative data sets are acquired (mammography, CT, MR, US), the surgeon has no reference from the imaging data when performing surgical tumor excision, apart from mental mapping based on the diagnostic scans and the anatomy being exposed to the surgeon's eyes. Once the patient is in the operating room, the possibilities for imaging are limited. Moreover, the pre-operative anatomical imaging data that is available often remains unemployed. During surgery, the surgeon has to rely on visual and tactile feedback, and tumor margins are often poorly defined. The lack of real-time feedback leads to significant percentage of positive margins that require additional surgeries at a later stage.

A way to improve the procedure is to use a camera that can make real-time visualization of the tissue during the surgical procedure. These cameras allow to extract from the images based on morphological features the boundary of the diseased tissue. In the above case this disease tissue would be the tumor.

Another way to enhance the diseased tissue is by making use of a hyper/multi spectral camera that can take images in different wavelength bands in order to increase the contrast for tissue discrimination. By comparing for each pixel the spectral information a decision can be made whether the pixel is linked to diseased tissue or to normal tissue and as a result the boundary is known as well.

Although both methods, one based on morphology and one based on spectral information provides results on the diseased tissue boundary they don't provide a measure for the inaccuracy of the determined boundary.

The problem is thus how to provide the diseased tissue boundary that also indicates the reliability.

Consequently, there exists a need in the surgical field to determine the diseased tissue boundary, and also to indicate its reliability.

SUMMARY OF THE INVENTION

In order to alleviate one or more of the aforementioned issues a medical image classification system and related method are provided.

The object of the present invention is solved by the subject matter of the independent claims, wherein further embodiments are incorporated in the dependent claims.

The described embodiments similarly pertain to the computer implemented method of determining a boundary of a tumor region or other diseased tissue, a computer program product comprising instructions which when executed on a processor cause the processor to carry out a method of determining a boundary of a tumor region or other diseased tissue, and an apparatus for determining a boundary of a tumor region or other diseased tissue. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect of the invention, there is provided a computer implemented method of determining a boundary of a tumor region or other diseased tissue. The method comprises the step of receiving hyper- or multi-spectral image data corresponding to a tissue sample comprising a tumor region or other diseased tissue. Further, the method comprises the steps of performing a morphological analysis of the hyper- or multi-spectral image data thereby generating a morphological tumor boundary or a morphological diseased tissue boundary corresponding to the tumor region or the other diseased tissue and performing a spectral analysis of the hyper- or multi-spectral image data thereby generating a spectral tumor boundary or a spectral diseased tissue boundary corresponding to the tumor region or the other diseased tissue. Further, the method comprises the step of generating a combined tumor boundary based on the morphological tumor boundary and the spectral tumor boundary or generating a combined diseased tissue boundary based on the morphological diseased tissue boundary and the spectral diseased tissue boundary.

The computer implemented method comprises the following steps: In a first step, hyper- or multi-spectral image data corresponding to a tissue sample comprising a tumor region or other diseased tissue are received. In contrast to a normal coloured image, which usually only comprises intensities of three wavelength bands in the visible spectrum, for example red, green and blue, a multi-spectral image comprises information about the intensities of a plurality of wavelength bands. A hyperspectral image contains for each pixel a complete spectroscopic analysis, such that the relative intensity of each wavelength can be derived. Thus, a hyper- or multi-spectral may contain more information than accessible by the human eye. For example, a tissue sample comprising a tumor region or other diseased tissue may have a uniform appearance for the human eye, but analysed with hyper- or multi-spectral imaging methods, differences between pixels of relative intensities in certain wavelength bands may appear. This wavelength bands may be assigned to chemical elements or compounds preferably present in tumor regions or other diseased tissue. The receiving of the hyper- or multi-spectral image data of the tissue sample can be performed during the surgery, while the tissue sample is located inside of a patient. Alternatively, also the analysation of a tissue sample which is resected from the patient can be performed. The computer implemented method analyses the hyper- or multi-spectral image data received in the first step with two different detection methods. This methods are a morphology-based analysis and a spectral-based analysis, which are performed in the second and in the third step. Each method generates a tumor boundary or a diseased tissue boundary as indication which part of the tissue sample is tumorous or diseased. In a morphology-based tumor boundary or diseased tissue boundary detection, one or more images in one of the wavelength bands is analysed to determine possible boundaries based on pixel intensity differences. The wavelength band may be selected by using deep neural network (or other machine learning methods) on the hyper- or multi-spectral image data. A first shape of the boundary of the tumor region or the diseased tissue may be determined using heuristic rules or machine learning on a database of the diseased/normal tissue. In a spectral-based tumor boundary or diseased tissue boundary detection, a pixel or a group of neighbouring pixels in the hyper- or multi-spectral data may be classified, based on the information obtained from the different wavelength bands, as normal or diseased tissue. This step may be performed using a deep neural network (or other machine learning method). This step may be repeated for all pixels or groups of pixels in the image. Based on this pixel classification a second shape of the boundary of the tumor region or the diseased tissue may be determined. In a fourth step, a combined tumor boundary or combined diseased tissue boundary is generated, which is obtained as a combination of the morphological tumor boundary or the morphological diseased tissue boundary and the spectral tumor boundary or the spectral diseased tissue boundary.

In case of the tissue sample comprising a tumor region, a morphological analysis of the hyper/multi-spectral image is performed thereby generating a morphological tumor boundary corresponding to the tumor region, and a spectral analysis of the hyper/multi-spectral image data is performed thereby generating a spectral tumor boundary corresponding to the tumor region. A combined tumor boundary based on the morphological tumor boundary and the spectral tumor boundary is generated.

In case of the tissue sample comprising diseased tissue, a morphological analysis of the hyper/multi-spectral image is performed thereby generating a morphological diseased tissue boundary corresponding to the diseased tissue region, and a spectral analysis of the hyper/multi-spectral image data is performed thereby generating a spectral diseased tissue boundary corresponding to the diseased tissue region. A combined diseased tissue boundary based on the morphological diseased tissue boundary and the spectral diseased tissue boundary is generated.

Preferably, the combined tumor boundary or the combined diseased tissue boundary comprises an indication of reliability. This indication of reliability can provide assistance to a physician in deciding which part of the tissue has to be removed in a surgical procedure. In doing so the boundary of the tumor region or the diseased tissue is determined using two independent techniques. By comparing the similarity of the boundaries the probability that the boundary is determined correctly is obtained. This will help the physician to know in which confidence level the boundary has been determined.

The computer implemented method according to the first aspect of the invention can be applied to tissue samples comprising a tumor region. Alternatively, the method can be applied to tissue samples comprising a region of diseased tissue. The diseased tissue can comprise diseases which are not connected to tumors. For example, the method can be applied to tissue samples comprising regions of inflamed tissue. The method according to the invention can be used to analyse tissue samples and to generate a boundary, which separates different kinds of tissue. Especially, the separation of diseased tissue and healthy tissue is provided. Further, the method provides an indication of a level of reliability of the generated boundary between diseased tissue and healthy tissue.

In an embodiment of the invention, the step of performing a morphological analysis of the hyper- or multi-spectral image data and/or the step of performing a spectral analysis of the hyper- or multi-spectral image data comprises processing at least a portion of the hyper- or multi-spectral image data with a deep neural network or a machine learning algorithm or an artificial intelligence (AI) module. This will be explained in more detail hereinafter.

According to another aspect of the invention, there is provided an artificial intelligence module for determining the boundary of a tumor region or other diseased tissue. In particular, this artificial intelligence module can be configured to perform a morphological analysis of the hyper/multi-spectral image data and/or to perform a spectral analysis of the hyper/multi-spectral image data.

An artificial intelligence module can be used for analysing the hyper- or multi-spectral image data. An artificial intelligence module is an entity that processes one or more inputs into one or more outputs by means of an internal processing chain that typically has a set of free parameters. The internal processing chain may be organized in interconnected layers that are traversed consecutively when proceeding from the input to the output.

Many artificial intelligence modules are organized to process an input having a high dimensionality into an output of a much lower dimensionality. For example, an image in HD resolution of 1920×1080 pixels lives in a space having a 1920×1080=2,073,600 dimensions. A common job for an artificial intelligence module is to classify images into one or more categories based on, for example, whether they contain certain objects. The output may then, for example, give, for each of the to-be-detected objects, a probability that the object is present in the input image. This output lives in a space having as many dimensions as there are to-be-detected objects. Typically, there are on the order of a few hundred or a few thousand to-be-detected objects.

Such a module is termed "intelligent" because it is capable of being "trained." The module may be trained using records of training data. A record of training data comprises training input data and corresponding training output data. The training output data of a record of training data is the result that is expected to be produced by the module when being given the training input data of the same record of training data as input. The deviation between this expected result and the actual result produced by the module is observed and rated by means of a "loss function". This loss function is used as a feedback for adjusting the parameters of the internal processing chain of the module. For example, the parameters may be adjusted with the optimization goal of minimizing the values of the loss function that result when all training input data is fed into the module and the outcome is compared with the corresponding training output data.

The result of this training is that given a relatively small number of records of training data as "ground truth", the module is enabled to perform its job, e.g., the classification of images as to which objects they contain, well for a number of records of input data that higher by many orders of magnitude. For example, a set of about 100,000 training images that has been "labelled" with the ground truth of which objects are present in each image may be sufficient to train the module so that it can then recognize these objects in all possible input images, which may, e.g., be over 530 million images at a resolution of 1920×1080 pixels and a color depth of 8 bits.

A neural network is a prime example of an internal processing chain of an artificial intelligence module. It consists of a plurality of layers, wherein each layer comprises one or more neurons. Neurons between adjacent layers are linked in that the outputs of neurons of a first layer are the inputs of one or more neurons in an adjacent second layer. Each such link is given a "weight" with which the corresponding input goes into an "activation function" that gives the output of the neuron as a function of its inputs. The activation function is typically a nonlinear function of its inputs. For example, the activation function may comprise a "pre-activation function" that is a weighted sum or other linear function of its inputs, and a thresholding function or other nonlinear function that produces the final output of the neuron from the value of the pre-activation function.

In an embodiment of the invention, the step of performing a spectral analysis of the hyper- or multi-spectral image data comprises classifying a cluster of neighbouring pixels as diseased or normal tissue.

The spectral analysis of the hyper- or multi-spectral image data can either be performed for each pixel of the image. Or clusters of neighbouring pixels can be used in the analysis in order to apply some noise reduction or to reduce computation time.

In an embodiment of the invention, the method further comprises the step of generating an indication of the reliability of the combined tumor boundary or of the combined diseased tissue boundary.

The combined tumor boundary or the combined diseased tissue boundary can be configured to provide an indication of reliability. Therefore, a comparison of the spectral tumor boundary and the morphologic tumor boundary or of the spectral diseased tissue boundary and the morphologic diseased tissue boundary provides information to determine a level of reliability. For example, if a region of the image is designated as tumorous or diseased in the spectral boundary as well as in the morphologic boundary, the probability to have tumorous or diseased tissue in this region can be regarded as high. On the other hand, if only one of the spectral boundary and the morphologic boundary shows tumorous or diseased tissue in a region, the probability to have tumorous or diseased tissue in this region can be regarded to be lower.

According to another aspect of the invention, there is provided a computer program product comprising instructions which when executed on a processor cause the processor to carry out a method of determining a boundary of a tumor region or other diseased tissue. The method comprises the step of receiving hyper- or multi-spectral image data corresponding to a tissue sample comprising a tumor region or other diseased tissue. Further, the method comprises the steps of performing a morphological analysis of the hyper- or multi-spectral image data thereby generating a morphological tumor boundary or a morphological diseased tissue boundary corresponding to the tumor region or the other diseased tissue and performing a spectral analysis of the hyper- or multi-spectral image data thereby generating a spectral tumor boundary or a spectral diseased tissue boundary corresponding to the tumor region or the other diseased tissue. Further, the method comprises the step of generating a combined tumor boundary based on the morphological tumor boundary and the spectral tumor boundary; or generating a combined diseased tissue boundary based on the morphological diseased tissue boundary and the spectral diseased tissue boundary.

In case of the tissue sample comprising a tumor region, a morphological analysis of the hyper/multi-spectral image is performed thereby generating a morphological tumor boundary corresponding to the tumor region, and a spectral analysis of the hyper/multi-spectral image data is performed thereby generating a spectral tumor boundary corresponding to the tumor region. A combined tumor boundary based on the morphological tumor boundary and the spectral tumor boundary is generated.

In case of the tissue sample comprising diseased tissue, a morphological analysis of the hyper/multi-spectral image is performed thereby generating a morphological diseased tissue boundary corresponding to the diseased tissue region, and a spectral analysis of the hyper/multi-spectral image data is performed thereby generating a spectral diseased tissue boundary corresponding to the diseased tissue region. A combined diseased tissue boundary based on the morphological diseased tissue boundary and the spectral diseased tissue boundary is generated.

According to another aspect of the invention, there is provided a medical image classification system for determining a boundary of a tumor region or other diseased tissue. The medical image classification system comprises a receiving device configured to receive spectral image data corresponding to a tissue sample comprising a tumor region or other diseased tissue. Further, the medical image classification system comprises a morphological analysis device configured to perform a morphological analysis of the spectral image data thereby generating a morphological tumor boundary or a morphological diseased tissue boundary corresponding to the tumor region or the other diseased tissue and a spectral analysis device configured to perform a spectral analysis of the spectral image data thereby generating a spectral tumor boundary or a spectral diseased tissue boundary corresponding to the tumor region or the other diseased tissue. Further, the medical image classification system comprises a combination device configured for generating a combined tumor boundary based on the morphological tumor boundary and the spectral tumor boundary or for generating a combined diseased tissue boundary based on the morphological diseased tissue boundary and the spectral diseased tissue boundary.

The medical image classification system may comprise a spectral camera as receiving device for generating spectral images during medical interventions. The spectral camera receives spectral image data corresponding to a tissue sample comprising a tumor region or other diseased tissue. The morphological analysis device and the spectral analysis device can be provided as separate devices. Alternatively, they can be provided as one device, which is configured to perform the morphological analysis and the spectral analysis simultaneously or consecutively. For example, one processor can be used for processing the various images generated by the spectral camera. Further, the medical image classification system comprises a combination device, which is configured to execute a boundary detection algorithm for receiving the processed images, and which generates a combined tumor boundary or a combined diseased tissue boundary. Preferably, this combined tumor boundary or combined diseased tissue boundary comprises an indication of reliability of the combined tumor boundary or of the combined diseased tissue boundary.

In case of the tissue sample comprising a tumor region, a morphological analysis of the hyper/multi-spectral image is performed thereby generating a morphological tumor boundary corresponding to the tumor region, and a spectral analysis of the hyper/multi-spectral image data is performed thereby generating a spectral tumor boundary corresponding to the tumor region. A combined tumor boundary based on the morphological tumor boundary and the spectral tumor boundary is generated.

In case of the tissue sample comprising diseased tissue, a morphological analysis of the hyper/multi-spectral image is performed thereby generating a morphological diseased tissue boundary corresponding to the diseased tissue region, and a spectral analysis of the hyper/multi-spectral image data is performed thereby generating a spectral diseased tissue boundary corresponding to the diseased tissue region. A combined diseased tissue boundary based on the morphological diseased tissue boundary and the spectral diseased tissue boundary is generated.

In an embodiment of the invention, the spectral image data is multispectral image data or hyperspectral image data.

The spectral image data can be multispectral image data or hyperspectral image data. In this embodiment of the invention, multispectral image data can be regarded as an image comprising intensities of a plurality of wavelength bands, particularly 4 to 15 wavelength bands. As hyperspectral image, an image can be regarded, which comprises a spectroscopic analysis for each pixel of the image.

In an embodiment of the invention, the morphological analysis and/or the spectral analysis of the spectral image data comprises the processing of at least a portion of the spectral image data with a deep neural network or a machine learning algorithm or an artificial intelligence module.

For example, the respective wavelength bands, which are used for the morphologic analysis, can be selected by a machine learning algorithm like a neural network. In the spectral analysis, the pixelwise classification of the image into tumorous or healthy tissue can be performed by a machine learning algorithm.

In an embodiment of the invention, the spectral analysis of the spectral image data comprises classifying of a cluster of neighbouring pixels as diseased or normal tissue.

In an embodiment of the invention, generating the combined tumor boundary comprises generating an indication of a reliability of the combined tumor boundary or generating the combined diseased tissue boundary comprises generating an indication of reliability of the combined diseased tissue boundary.

In an embodiment of the invention, the system is configured for dividing the spectral image into subparts, and the indication of the reliability of the combined tumor boundary is based on a level of similarity of the morphological tumor boundary and the spectral tumor boundary in each subpart of the spectral image or the indication of the reliability of the combined diseased tissue boundary is based on a level of similarity of the morphological diseased tissue boundary and the spectral diseased tissue boundary in each subpart of the spectral image.

The first and second boundary may be divided into subparts. The similarity between the first and second boundary sub-parts may is determined, and the boundary sub-parts are coded according to the level of similarity.

For combining the morphologic boundary and the spectral boundary, and particularly for determining the indication of reliability of the combined boundary, various methods can be used. In this embodiment of the invention, the indication of reliability is obtained by a segmentation of the combined boundary into subparts. A level of similarity can be obtained for each subpart, which indicates to what extend the morphologic boundary and the spectral boundary coincide in this subpart. This level of similarity can be used for generating the indication of reliability.

In an embodiment of the invention, the system is configured for presenting the indication of reliability of the combined tumor boundary or the combined diseased tissue boundary in an image on an image display as color-coding.

The indication of reliability can be presented in an image on an image display. In this embodiment of the invention, a colour coding is used to present the indication of reliability. For example, a high level of confidence can be depicted in green, and a low level of confidence can be depicted in yellow.

In an embodiment of the invention, the system is configured for presenting the indication of reliability of the combined tumor boundary or the combined diseased tissue boundary in an image on an image display as a line with variable thickness or structure.

The indication of reliability can be presented in an image on an image display. In this embodiment of the invention, a line with variable thickness or structure can be used to indicate the level of confidence of a respective subpart of the combined tumor boundary or of the combined diseased tissue boundary.

In an embodiment of the invention, the system is configured for coding the indication of reliability of the combined tumor boundary or the combined diseased tissue boundary with a line having a thickness that corresponds to a confidence or an accuracy with which the combined tumor boundary or the combined diseased tissue boundary has been determined.

The thickness of the line indicates the level of confidence. For example, a thick line can present a high level of confidence, while a thin line can present a lower level of confidence.

In an embodiment of the invention, the system is configured for providing a boundary with a highest level of confidence as a solid line and a boundary with a lower level of confidence as a dashed line.

In this embodiment of the invention, the structure of a line is used to indicate the reliability of the combined tumor boundary or of the combined diseased tissue boundary. For example, a solid line indicates a highest level of confidence, a dashed line indicates a medium level of confidence, and a dotted line indicates a lowest level of confidence.

Advantageously, the benefits provided by any of the above aspects equally apply to all of the other aspects and vice versa.

The above aspects and embodiments will become apparent from and be elucidated with reference to the exemplary embodiments described hereinafter. Exemplary embodiments of the invention will be described in the following with reference to the following drawings:

BRIEF DESCRIPTION OF THE DRAWINGS

FIGS. 3A-3C show an example of tissue sample scanned, with pathology analysis, in which FIG. 3A shows a normal image, FIG. 3B shows pathology labelling, and FIG. 3C shows overlay pathology on normal image;

FIG. 4 shows annotated pixel spectral data;

FIG. 5 shows a convolutional neural net configuration trained for pixel spectra classification;

FIG. 6 shows a tissue classification based on pixel spectral data analysis with a deep neural network: tumor regions are shown in medium grey level, muscle region in bright grey, and others in dark;

FIG. 15 shows a reflectance mean and standard error (vertical) versus wavelength in nm for patients 2 (left) and 4 (right);

FIG. 16 shows the results of the dual stream experiment;

FIG. 17 shows a plot with the AUC in bars for all patients;

DETAILED DESCRIPTION OF EMBODIMENTS

Figure 1:
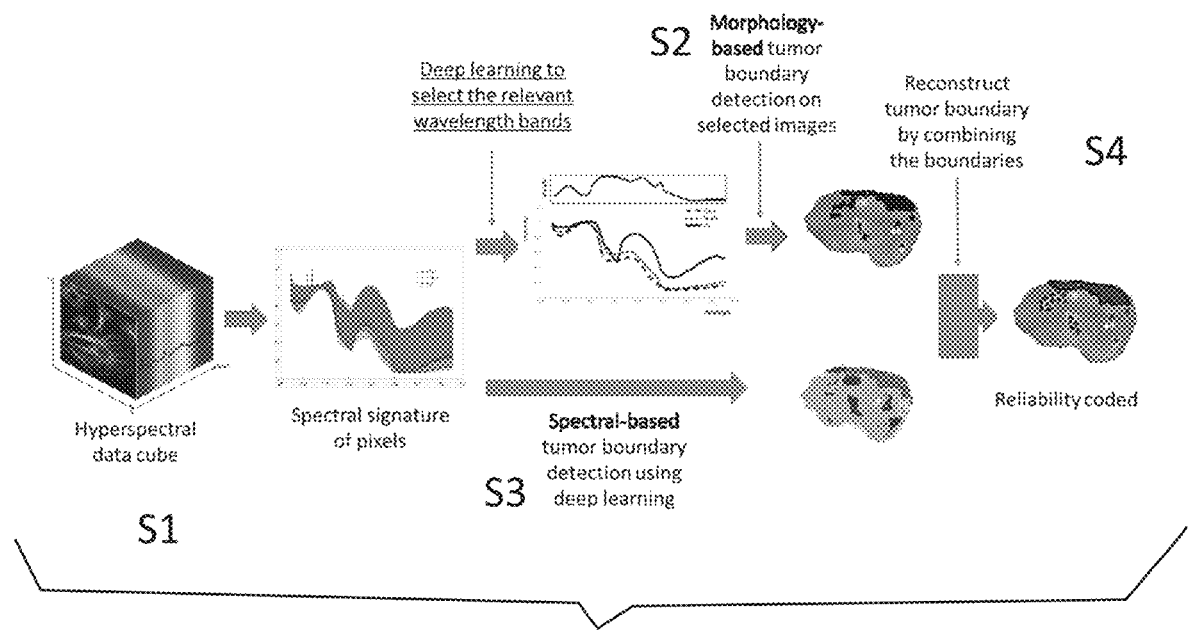
FIG. 1 shows a block diagram of a computer implemented method of determining a boundary of a tumor according to an exemplary embodiment of the present invention.

FIG. 1 shows a block diagram of a computer implemented method of determining a boundary of a tumor according to an exemplary embodiment of the present invention. Starting with receiving (S1) a hyperspectral data cube of a tissue sample, which includes the spectral signature of each pixel of the image, a two-fold approach is performed: On the one hand, relevant wavelength bands are selected, preferably by deep learning or a neural network. The image in the respective wavelength band is analysed in a morphological approach (S2) thereby generating a morphological tumor boundary. On the other hand, the spectral information of each pixel or a group of neighbouring pixels is analysed in a spectral approach (S3). Preferably, an AI module or deep learning, as described herein in detail, is used to classify the pixel or the group of neighbouring pixels in tumorous or healthy tissue, thereby generating a spectral tumor boundary. By combining (S4) the morphological tumor boundary and the spectral tumor boundary, a combined tumor boundary is obtained, which can give an indication of reliability.

Spectral-Based Tumor Boundary Detection

Figure 2:
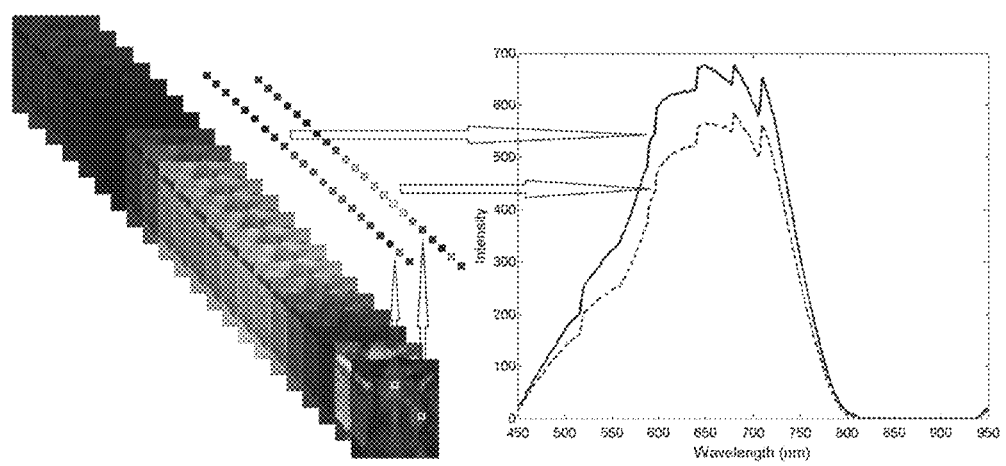
FIG. 2 shows a hyperspectral data cube and pixel spectral data.

Hyperspectral imaging provides a complete spectral fingerprint of the object at pixel level, which can be used for discriminating different tissue types like tumor versus healthy. So one way of detecting diseased tissue regions/boundaries can be implemented by pixel (spectra) based hyperspectral data classification. The sample tissues are captured by the hyperspectral camera in the format of a 3-dimensional data cube, where each pixel in the spatial image plane contains 1-dimensional spectral data describing tissue spectral property at that position. FIG. 2 illustrates the hyperspectral data cube and two pixel spectral data curves.

For the tissue scanned by hyperspectral camera, the pathology analysis can be done to obtain the tissue labelling, which can be used to annotate the hyperspectral data cube. FIGS. 3A-3C show an example of the tissue sample with pathology labelling, where FIG. 3A shows a normal image of the tissue sample, FIG. 3B shows the corresponding pathology labelling (as different tissue types), and FIG. 3C shows the overlay of pathology on the tissue image.

Using the pathology labelling, the pixel spectra in the data cube are annotated as different tissue categories (e.g., tumor, muscle, fat.). FIG. 4 shows the annotated pixel spectra data for tumorous tissue 121, healthy muscle 131 and fat 132.

With the annotated pixel spectral data, a deep learning framework (e.g., deep one dimensional convolutional neural net) can be used to train a hyperspectral tissue classification neural network.

FIG. 5 shows one of the convolutional neural net configurations trained for pixel spectra classification. The trained neural network can classify each tissue pixel spectra in the date cube into different tissue categories effectively, leading to tumor boundary detection. An example of tissue classification (different tissue region coded by different grey level) is shown in FIG. 6.

Instead of classification per pixel spectra, the pixels can alternatively be classified based on the spectral information of the neighbouring pixels, for example, in a patch of n-by-n pixels (n is decided based on the scale of the image).

Classification can alternatively be done (1) by fitting the data and extracting physiological parameters and discriminate based on these parameters, (2) partial least square discriminant analysis (PLS-DA), (3) support vector machine and (4) classification and regression trees (CART) analysis.

Morphology-Based Tumor Boundary Detection

Figure 7:
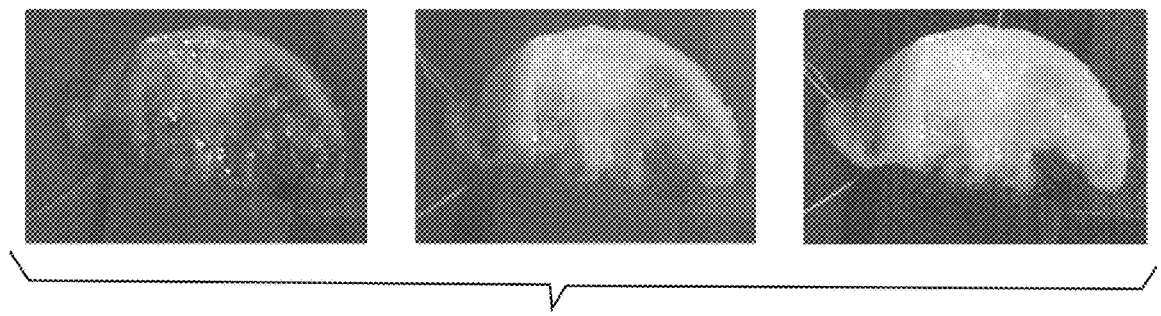
FIG. 7 shows the tissue sample of FIG. 6 viewed at different wavelength bands.
Figure 8:
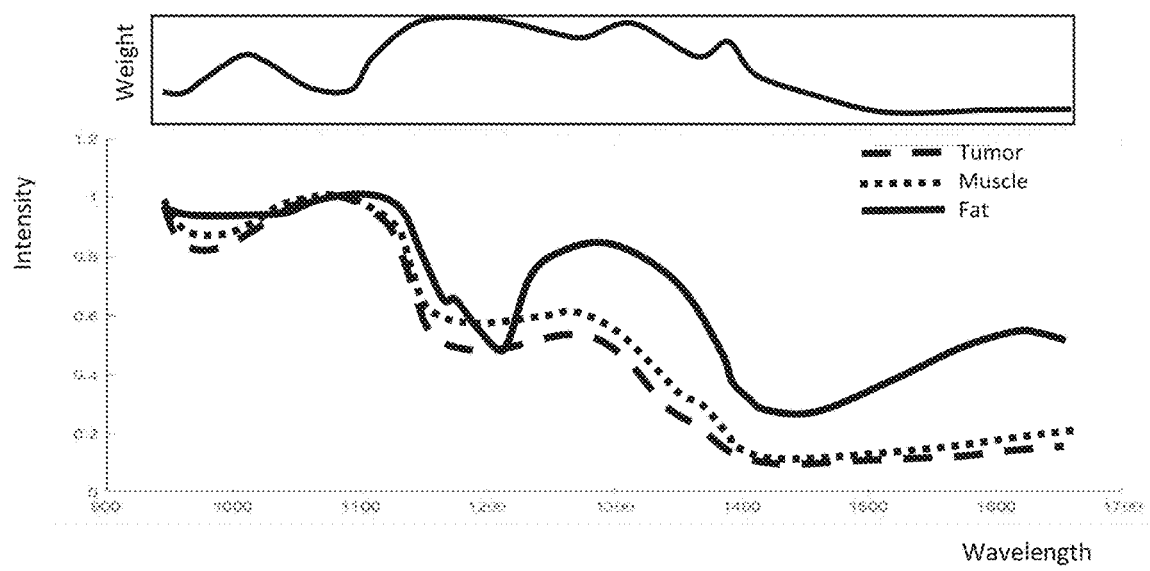
FIG. 8 shows a spectral feature activation map, i.e., the importance heat map for tumor classification: a high weight means "important" (the corresponding wavelength often used for tumor detection), while a low weight means "unimportant" (the corresponding wavelength not used)

Another way of diseased tissue regions/boundaries detection can be implemented by intensity based image region segmentation in individual images. FIG. 7 shows the image of the same tissue sample at different wavelength bands. As can be seen, depending on tissue type, a particular tissue (e.g., tumor) can be better detected at particular wavelengths. The best image(s) or wavelength band(s) for morphology-based tumor boundary detection may be selected using a data-driven deep learning framework. In the training, a deep convolutional neural network for hyperspectral tumor detection, described in the above step, the activation map of spectral feature can be derived, which shows which wavelengths are important for tumor detection. FIG. 8 shows an example of the importance heat map for tumor classification. High weight means "important" (i.e., the corresponding wavelength often used for tumor detection), while low weight means "unimportant" (the corresponding wavelength not used for tumor detection).

Figure 9:
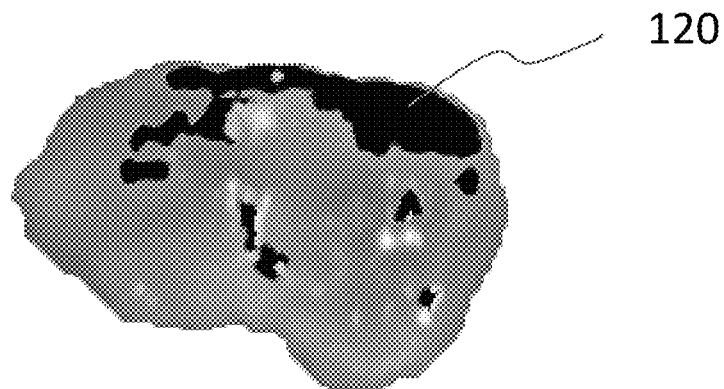
FIG. 9 shows a tissue classification based on intensity using the selected spectral images.

From this heat map, one or more wavelength bands (images) are selected for morphology tumor boundary detection. On the selected image, heuristic rules or machine learning trained on a database of the diseased/normal tissue, can be used to detect the boundary of the diseased tissue. FIG. 9 shows an example of tumor boundary detection in the selected image. The boundaries determined in different images can be combined to determine the boundary of the diseased tissue, for example, to calculate the mean shape of these boundaries. Alternatively, all the boundaries in these images may be used in the final boundary combination step.

In another embodiment, an artificial image can be determined from all the images at the various wavelength bands by making a new image with high contrast per pixel. Hence one may for example start by taking a pixel and consider the surrounding four pixels. The contrast is defined as the intensity difference between the pixel and the 4 neighboring pixels. The pixel out of the image in the wavelength band giving the highest contrast is selected. This is repeated for each pixel. As a result the new artificial image has intensity for the pixel coming out of different wavelength bands. The new image has no wavelength information. The new image is used to determining possible boundaries.

Determining the Similarity Between Boundaries

Ultimately, the tumor boundaries determined using the above techniques are combined. By comparing the similarity of detected boundaries, the probability that the boundary is determined correctly is obtained. This will indicate to the physician the accuracy, or the confidence level, with which a boundary has been determined.

In one embodiment, the first and the second boundary are divided in subparts, and the similarity between the first and second boundary parts are computed as the distance between the two boundaries, which is used as the confidence indication. The boundary parts will then be coded according to the level of similarity.

In one embodiment the boundary is color coded based on the similarity and presented in the image on an image display.

In one embodiment the spectral-based classification is based on a deep learning algorithm.

In one embodiment the boundary is color-coded based on the similarity and presented in the image on an image display.

Figure 10:
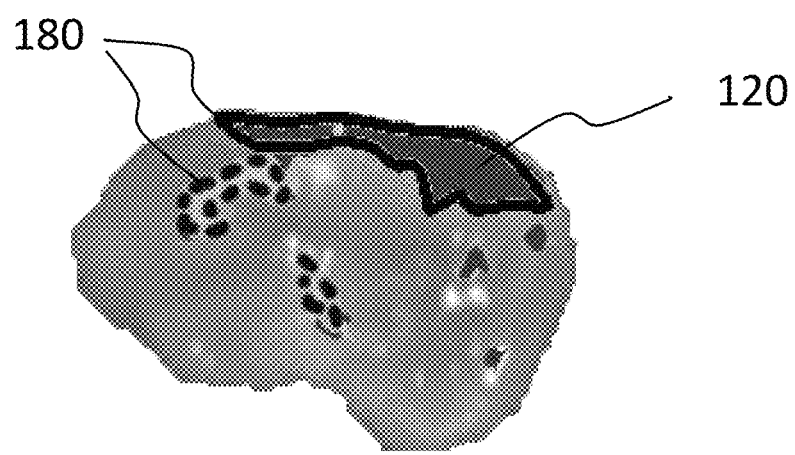
FIG. 10 shows an example of a line coded combined tumor boundary, where solid means high confidence, dashed means low confidence.

In one embodiment the boundary is coded with a line with variable thickness. For instance the thicker the line the more confident the boundary is determined. For example, if the distance between the boundaries is larger than a certain value, the boundary is given in yellow as dashed line, otherwise as solid line, as shown in FIG. 10.

Figure 19:
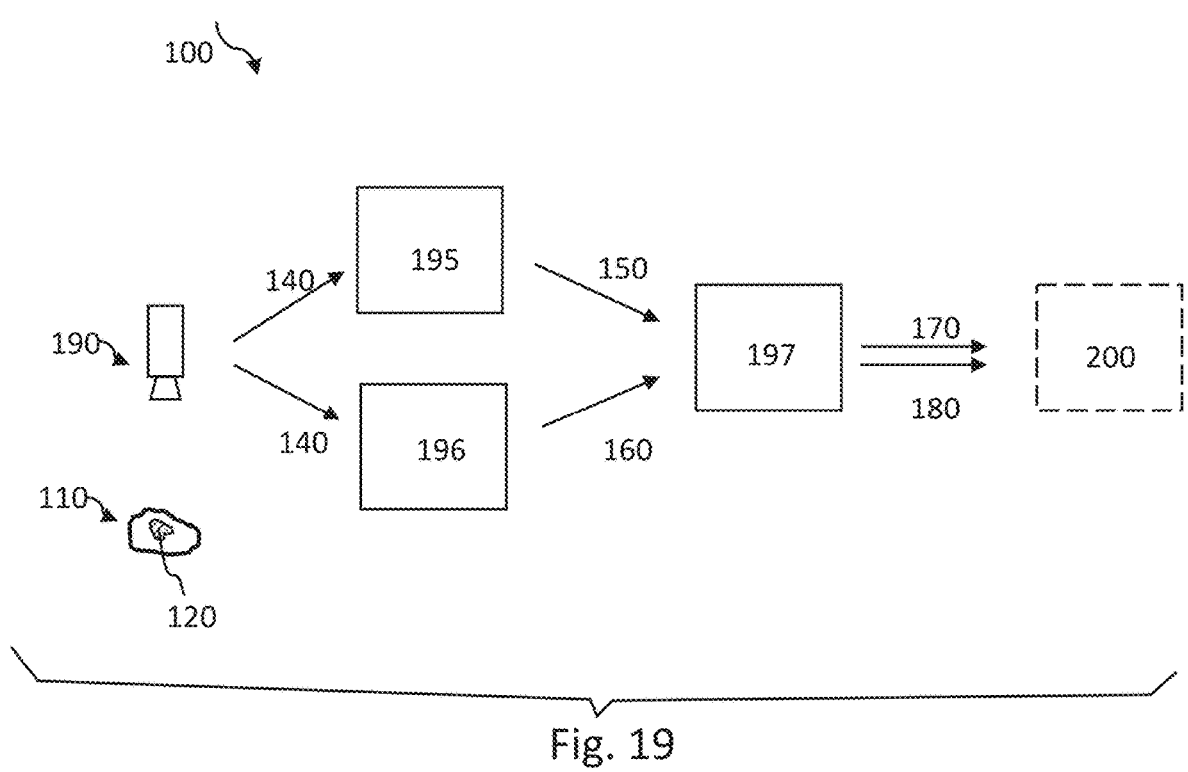
FIG. 19 shows a schematic set-up of a medical image classification system according to the invention.

FIG. 19 shows a schematic set-up of a medical image classification system according to the invention. A receiving device 190 is configured to receive hyperspectral image data 140 of a tissue sample 110 corresponding to a tumor region 120. The hyperspectral image data 140 are transmitted to a morphological analysis device 195 and a spectral analysis device 196. The morphological analysis device 195 is configured to perform a morphological analysis of the spectral image data 140 thereby generating a morphological tumor boundary 150 corresponding to the tumor region 120. The spectral analysis device 196 is configured to perform a spectral analysis of the spectral image data thereby generating a spectral tumor boundary 160 corresponding to the tumor region 120. Both tumor boundaries are transmitted to a combination device 197 configured for generating a combined tumor boundary 170 based on the morphological tumor boundary 150 and the spectral tumor boundary 160. The combination device 197 can generate an indication of reliability 180 of the combined tumor boundary 170. The combined tumor boundary 170 and the indication of reliability 180 of the combined tumor boundary 170 can be transmitted to an image display 200. The image display can display the combined tumor boundary 170 with the indication of reliability 180.

A detailed exemplarily embodiment of the present invention is shown in the following, which relates to a dual stream network for tumor detection in hyperspectral images.

Hyperspectral imaging has its roots in geological remote sensing, but medical applications are rising because it is easily integrated in the current surgical work flow. Considering tumors in tongue tissue, a combination of both the spectral and structural information in the hyperspectral data cube is explored. A dual stream model is proposed, with a spectral and a structural branch. Data is collected from 7 patients with tongue squamous cell carcinoma using a hyperspectral imaging system measuring wavelengths from 480 to 920 nm. Histopathological analysis provided ground truth labels. The proposed method is compared with pure spectral and structural approaches. The dual stream model outperforms spectral and structural approaches with areas under the ROC-curve of 0.90, 0.87 and 0.85, respectively.

1. INTRODUCTION

Patients suffering from tumors in tongue tissue are generally treated by removing the tumor tissue surgically. Removal of the complete tumor is challenging, since the procedure relies on palpation. Currently there is no reliable way to provide real-time feedback to the surgeon, and tissue must be sent to the pathology department for analysis. This is a time costly process and technology that can support the surgeon in realtime will increase the effectiveness of the procedure. Hyperspectral imaging (HSI) was originally developed for remote sensing by NASA/JPL [1] and has been successfully used in multiple fields such as food quality and safety, vegetation and resource control, archaeology and biomedicine [2]. With advancements in hardware and computational power, it has become an emerging imaging modality for medical applications. HSI has the potential advantages of low cost, relatively simple hardware and ease of use. This makes HSI a candidate for intra-operative support of a surgeon, because it is easily integrated in the current surgical work flow. Compared to regular RGB data it is challenging to process the HSI data due to the size of the data: hundreds of color bands in a multi-megapixel image results in large files with varying amounts of redundant information.

Fei et al. [3] have evaluated the use of HSI on specimen from patients with head and neck cancer. Multiple specimens have been taken from each of the 16 patients, and the specimen have been scanned with wavelengths from 450 to 900 nm. Specimen from 10 of the 16 patients are verified to be squamous cell carcinoma (SCCa). With 5×5 blocks of data from the SCCa tumors, they achieved an area under the ROC-curve (AUC) of 0.94 classifying tumor and normal tissue with a linear discriminant analysis. However, testing is done on specimens from the same patient as the classification was trained on. Halicek et al. [4] applied a deep convolutional network as classifier for 5×5 patches. They acquired multiple specimen from 50 head and neck cancer patients in 450-900 nm spectral range. 29 of the patients had SCCa tumors. Using patient held-out external validation an accuracy of 77% is reported for the SCCa group. An animal study by Ma et al. [5] achieved an accuracy of 91.36% using convolutional neural networks in a leave-one-out cross validation. The specimen were taken from mice with induced tumors. The input for the classifier is a one dimensional spectral vector. In all three mentioned studies the focus lies entirely on spectral information. The first two studies use a very small spatial area of 5×5 pixels, and Ma et al. uses an 1×1 area. In this paper a combination of both the spectral and structural information in the HSI data cube is explored. A dual stream model is proposed, with a spectral and a structural branch. Data is collected from 7 patients with tongue SCCa using a HSI system measuring wavelengths from 480 to 920 nm. Histopathological analysis provided ground truth labels. The proposed method is compared with pure spectral and structural approaches.

2. METHODS

Figure 11:
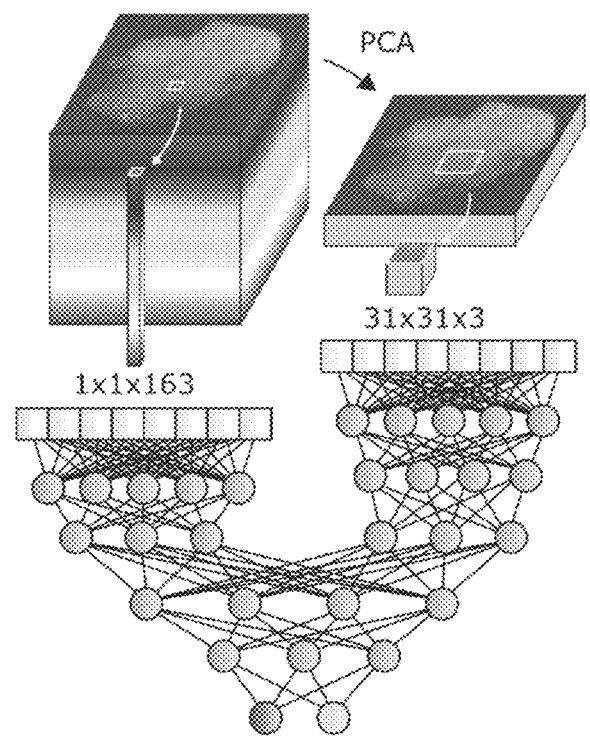
FIG. 11 shows the HSI data of a 1×1×163 spectral signature fed into the spectral branch of the combined network. After applying PCA, resulting in three channels, 31×31 patches are used for the structural branch. Branches have been trained and tested individually.

The HSI scan results in a data cube for each tissue sample. Using small patches spanning all bands the spectral information can be considered. By selecting bigger patches, structural information becomes available. By combining both inputs, the full spectral and some structural information is available for the network. FIG. 11 shows the architecture of the dual stream network.

2.1. Spectral Branch

To exploit the full extent of the spectral information, a network is designed for using small patches including the full spectrum of the HSI data. To filter out noise, the average spectrum of 5×5 pixels is calculated and the resulting vector is used as input for a neural network. The network has two hidden layers of 163 and 80 units and finally a softmax output layer. During training a dropout layer with rate 0.5 is used before the final softmax layer. This results in 40,014 trainable parameters. To be able to compare the dual stream network with just a spectral method, the spectral network is separately trained and tested.

2.2. Structural Branch

By increasing the patch size, morphological features in the HSI data can be used to classify the tissue. Due to the high number of parameters in the network needed for those patches, the number of channels has been reduced using a principle component analysis (PCA). With 3 channels approximately 92% of variance is contained in the resulting 31×31×3 patches. Larger numbers of channels have been considered in the same network architecture, but did not increase performance significantly. The neural network used for this method flattens the input and has three fully connected layers of 1024, 128 and 64 units, a dropout layer during training and a final softmax layer. This gives 3,084,674 trainable parameters.

2.3. Dual Stream Network

When combining the spectral and structural information, the classifier has many features available, without the need of a 31×31×163 data cube. To use 1×1×163 and 31×31×3 patches the previous networks have been combined into a dual stream network. The spectral and structural branches are unchanged in both architecture and weights using transfer learning. Instead of the softmax output layers, the second fully connected layer of both networks is concatenated and fed into two new dense layers of 128 and 64 units. These are connected to a dropout layer and softmax for the output. The combined network has 26,946 trainable parameters.

3. EXPERIMENTS 3.1. Clinical Data Set

Figure 12:
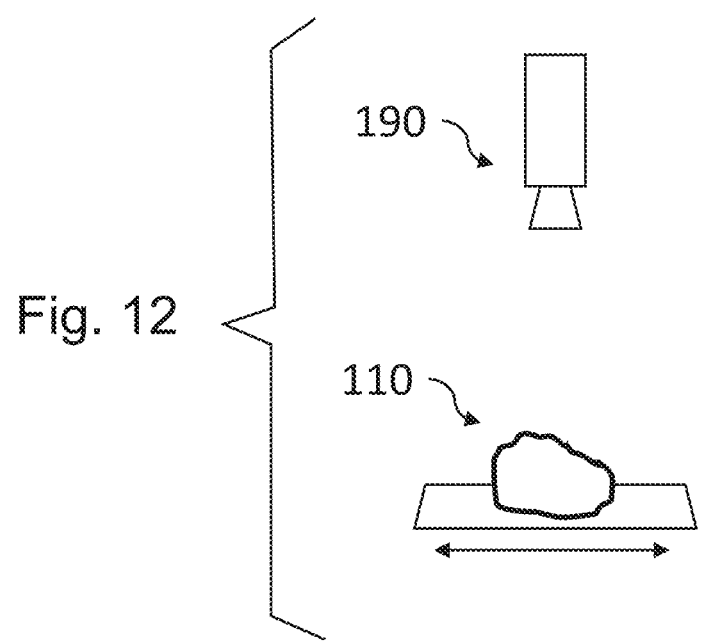
FIG. 12 shows a schematic set-up of an imaging system used to collect the HSI data. Tissue is placed on the table in the bottom. The table shifts the tissue under the sensor.
Figures 13, 14:
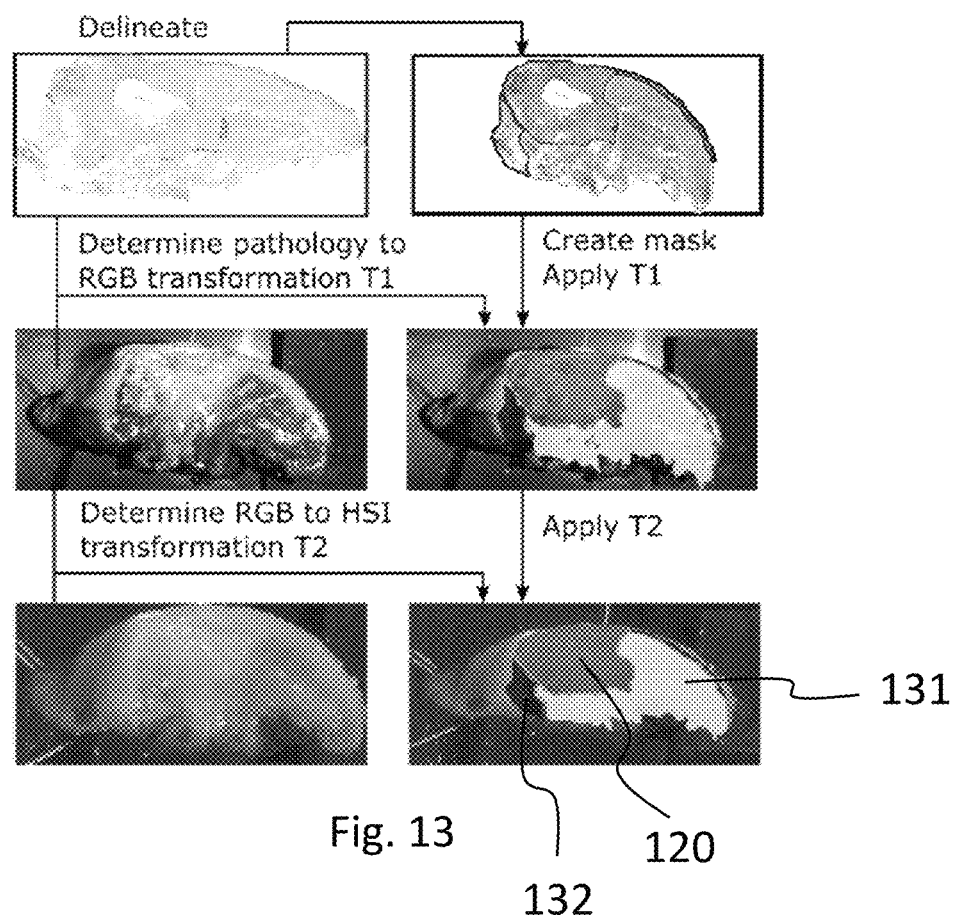
FIG. 13 shows an annotation of the hyperspectral data: tumor 120, healthy tongue muscle 131 and healthy epithelium 132.
FIG. 14 shows a pixel count of an exemplary data set, in thousands.

Tissue of 7 patients with tongue squamous cell carcinoma has been resected by the surgeon. Directly after resection, the specimen was brought to the pathology department, where it is processed according to standard pathological protocol. The pathologist localized the tumor by palpation and cut the specimen in two parts, right through the middle of the tumor. Images are then taken from these new surfaces. All processes performed at the hospital follow the ethical guidelines for ex vivo human studies. An RGB picture of the tissue is taken to function as an intermediate step in the registration process. To get a hyperspectral image of the tissue, an imaging system with a line-scan sensor manufactured by IMEC (Leuven, Belgium) is used to capture the diffuse reflectance with wavelengths ranging from 480 to 920 nm in 163 channels. The imaging system is shown in FIG. 12. The image is recorded line-by-line with 2048 samples per line while shifting the tissue. The system has been calibrated using a light reference image before use and after scanning the data was cropped to a region of interest. In order to label the HSI data, a histopathological slide is taken from the surface that has been scanned. The slide is digitized and delineated to mark the tumor 120, healthy muscle 131 and epithelium 132. This is the first step shown in FIG. 13. From the delineation a mask is created. During histopathological processing the specimen was deformed and to correct this, a non-rigid registration algorithm is used. Obvious matching points in the histopathological and RGB images were visually selected. Using these points, the mask is transformed to match the RGB picture. This is depicted in FIG. 13 in middle row as transformation T1. The point-selection is done again on the RGB and HSI data to acquire transformation T2, which is used to transform the mask again to match the HSI data. Using the mask the data can be explored. FIG. 14 shows the number of pixels for patients and classes in the mask. FIG. 15 shows the mean spectra of patients 2 and 4 for the tumor and muscle classes. At a wavelength of 630 nm is a clear drop in reflectance, which is present in all HSI images and caused by the hardware. Generally the muscle mean is lower as the tumor mean, but there is a clear overlap of the two classes. To work with the limited data set, leave-one-patient-out cross validation is used during training. To have a balanced training process a 50/50 balance for the tumor and healthy classes has been set for the patch selection. To evaluate the experiments, the area under the ROC-curve (AUC) is used. This gives a reasonable indication of performance, without choosing a threshold for the classification.

3.2. Experiment Results

Figure 18:
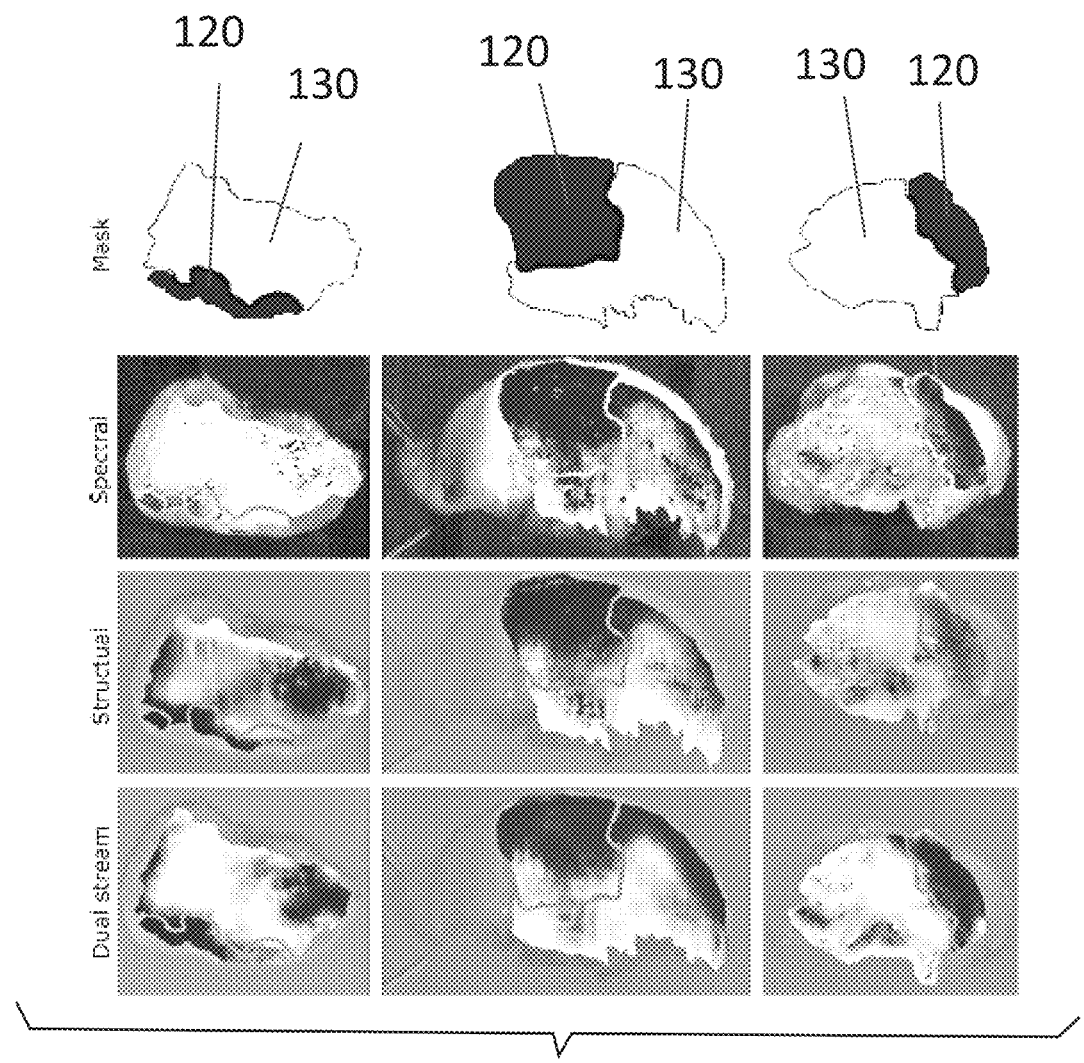
FIG. 18 shows the ground truth and predictions of the spectral, structural and dual stream approach of patients 2 (left), 4 (middle) and 7 (right). Tumor (dark), healthy (bright)

The results of our proposed method are shown in FIG. 16. The combination of spectral and structural streams gives a mean AUC of 0.904±0.053. A comparison with the individual features is summarized in FIG. 17, showing the AUC for the three methods applied to all patients. Using the spectral input, a relatively small network achieves a mean AUC of 0.872±0.050 after training for 10 epochs. Predictions of full HSI images are shown in the second row in FIG. 18. The intensity is a direct representation of the predictions.

This means that when the grey level is shown with its maximal intensity, the model makes a clear distinction. The model cannot make a strong distinction between classes in significant areas of the predictions of patients 4 and 7. The model performs the worst on patient 2, leaving much of the tumor undetected. With the structural network, using larger patches but fewer spectral bands, results are similar compared to the spectral network. The AUC is 0.850±0.077. In patient 2 large areas are misclassified as tumor but overall the result is somewhat smoother, suggesting the structural context is used by the model. The dual stream model, shown on the last row, generates the best predictions. It can clearly be seen in FIG. 18 that the model makes confident decisions, despite misclassified regions. For patient 4, it is verified that most of the misclassified area is epithelia, which might have similar features as tumor.

3.3. Discussion

In this work, for the first time, we make explicit use of both the structural and spectrum information by applying a dual stream neural network. Considering a small-size dataset, we strategically train our model by two steps. First, we train each stream of our model separately. Second, we add fully connected layers (FCN) to the streams and only the parameters of FCNs need to be trained. In the future, we will investigate the possibility of applying other network types such as a long short-term memory (LSTM) model for the spectrum domain stream and convolutional networks for the structural stream. All models have been trained for 10 epochs, but performance barely increased over the epochs. This indicates that the model reaches the full capacity in an early stage. That might be caused by the limited data set, or by the fact that the network is very shallow. In the future, more data will be collected to improve the effectiveness of the model. Many of the false positives are found at the edge of the samples. This can be explained by the fact that these tumors often originate in the epithelia, and therefore the spectral features can have a resemblance. The imaging system uses a line-by-line scanning method, which makes real time applications difficult. In the future, channel selection can be performed instead of PCA to enable the manufacturer to construct a sensor with only specified wavelengths to reduce imaging time.

4. CONCLUSION

Given the limited data, it is possible to train networks that combine spectral and structural information and have a good performance on the classification of healthy and tumor tissue. From the data processing perspective, this opens the possibility of intra-operative feedback to surgeons. More elaborate networks can be studied to increase performance and efficiency.

5. REFERENCES

[1] Alexander F. H. Goetz, "Three decades of hyperspectral remote sensing of the earth: A personal view," Remote Sensing of Environment, vol. 113, pp. S5-S16, 2009, Imaging Spectroscopy Special Issue.

[2] Guolan Lu and Baowei Fei, "Medical hyperspectral imaging: a review," Journal of Biomedical Optics, vol. 19, pp. 19-19-24, 2014.

[3] Baowei Fei, Guolan Lu, Xu Wang, Hongzheng Zhang, James V. Little, Mihir R. Patel, Christopher C. Griffith, Mark W. El-Diery, and Amy Y. Chen, "Label-free reflectance hyperspectral imaging for tumor margin assessment: a pilot study on surgical specimens of cancer patients," Journal of Biomedical Optics, vol. 22, pp. 22-22-7, 2017.

[4] Martin Halicek, Guolan Lu, James V. Little, Xu Wang, Mihir Patel, Christopher C. Griffith, Mark W. El-Deiry, Amy Y. Chen, and Baowei Fei, "Deep convolutional neural networks for classifying head and neck cancer using hyperspectral imaging," Journal of Biomedical Optics, vol. 22, pp. 22-22-4, 2017.

[5] Ling Ma, Guolan Lu, Dongsheng Wang, Xu Wang, Zhuo Georgia Chen, Susan Muller, Amy Chen, and Baowei Fei, "Deep learning based classification for head and neck cancer detection with hyperspectral imaging in an animal model," Proc. SPIE, vol. 10137, pp. 10137-10137-8, 2017. While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

LIST OF REFERENCE SIGNS

100 medical image classification system
110 tissue sample
120 tumor region or other diseased tissue
121 tumorous/diseased tissue
130 normal tissue
131 healthy muscle
132 healthy fat/epithelium/others
140 spectral image data
150 morphological tumor boundary
160 spectral tumour boundary
170 combined tumor boundary
180 indication of reliability
190 receiving device
195 morphological analysis device
196 spectral analysis device
197 combination device
200 display

The invention claimed is:

1. A computer implemented method of determining a boundary of a tumor region or other diseased tissue, the method comprising:
receiving hyper/multi-spectral image data corresponding to a tissue sample comprising a tumor region or other diseased tissue;
performing a morphological analysis of the hyper/multi-spectral image data to generate a morphological tumor boundary or a morphological diseased tissue boundary corresponding to the tumor region or the other diseased tissue;
performing a spectral analysis of the hyper/multi-spectral image data to generate a spectral tumor boundary or a spectral diseased tissue boundary corresponding to the tumor region or the other diseased tissue;

generating a combined tumor boundary based on the morphological tumor boundary and the spectral tumor boundary or generating a combined diseased tissue boundary based on the morphological diseased tissue boundary and the spectral diseased tissue boundary; and determining reliability of the combined tumor boundary by comparing the morphological tumor boundary and the spectral tumor boundary or determining reliability of the combined diseased tissue boundary by comparing the morphological diseased tissue boundary and the spectral diseased tissue boundary.

2. The computer implemented method according to claim 1, wherein performing a morphological analysis of the hyper/multi-spectral image data and/or performing a spectral analysis of the hyper/multi-spectral image data comprises:

processing at least a portion of the hyper/multi-spectral image data with a deep neural network or a machine learning algorithm.

3. The computer implemented method according to claim 2, wherein performing a spectral analysis of the hyper/multi-spectral image data comprises:

classifying a cluster of neighboring pixels as diseased or normal tissue.

4. The computer implemented method according to claim 1 further comprising:

generating an indication of reliability of the combined tumor boundary or of the combined diseased tissue boundary.

5. The computer implemented method according to claim 1, wherein the morphological analysis includes selection of a wavelength band and performance of an intensity-based analysis of the hyper/multi-spectral image data in the selected wavelength band.

6. The computer implemented method according to claim 1, wherein:

(i) the reliability of the combined tumor boundary is determined by:
    dividing the morphological tumor boundary into first subparts and the spectral tumor boundary into second subparts,
    determining a similarity level of the morphological tumor boundary and the spectral tumor boundary by computing a distance between the first subparts and the second subparts, and
    computing a confidence level of the combined tumor boundary based on the determined similarity level; or (ii) the reliability of the combined diseased tissue boundary is determined by:
    dividing the morphological diseased tissue boundary into first subparts and the spectral diseased tissue boundary into second subparts,
    determining a similarity level of the morphological diseased tissue boundary and the spectral diseased tissue boundary by computing a distance between the first subparts and the second subparts, and
    computing a confidence level of the combined diseased tissue boundary based on the determined similarity level.

7. A non-transitory computer-readable storage medium having stored a computer program product comprising instructions which when executed by a processor, cause the processor to:

receive hyper/multi-spectral image data corresponding to a tissue sample comprising a tumor region or other diseased tissue;

perform a morphological analysis of the hyper/multi-spectral image data to generate a morphological tumor boundary or a morphological diseased tissue boundary corresponding to the tumor region or the other diseased tissue;

perform a spectral analysis of the hyper/multi-spectral image data to generate a spectral tumor boundary or a spectral diseased tissue boundary corresponding to the tumor region or the other diseased tissue;

generate a combined tumor boundary based on the morphological tumor boundary and the spectral tumor boundary; or generating a combined diseased tissue boundary based on the morphological diseased tissue boundary and the spectral diseased tissue boundary; and determine reliability of the combined tumor boundary by comparing the morphological tumor boundary and the spectral tumor boundary or determine reliability of the combined diseased tissue boundary by comparing of the morphological diseased tissue boundary and the spectral diseased tissue boundary.

8. The non-transitory computer-readable storage medium according to claim 7, wherein the instructions, when executed by the processor, further cause the processor to:

(i) determine the reliability of the combined tumor boundary by:
    dividing the morphological tumor boundary into first subparts and the spectral tumor boundary into second subparts,
    determining a similarity level of the morphological tumor boundary and the spectral tumor boundary by computing a distance between the first subparts and the second subparts, and
    computing a confidence level of the combined tumor boundary based on the determined similarity level; or (ii) determine the reliability of the combined diseased tissue boundary by:
    dividing the morphological diseased tissue boundary into first subparts and the spectral diseased tissue boundary into second subparts,
    determining a similarity level of the morphological diseased tissue boundary and the spectral diseased tissue boundary by computing a distance between the first subparts and the second subparts, and
    computing a confidence level of the combined diseased tissue boundary based on the determined similarity level.

9. A medical image classification system for determining a boundary of a tumor region or other diseased tissue, the medical image classification system comprising:

a receiving device configured to receive spectral image data corresponding to a tissue sample comprising a tumor region or other diseased tissue;

a morphological analysis device configured to perform a morphological analysis of the spectral image data to generate a morphological tumor boundary or a morphological diseased tissue boundary corresponding to the tumor region or the other diseased tissue;

a spectral analysis device configured to perform a spectral analysis of the spectral image data to generate a spectral tumor boundary or a spectral diseased tissue boundary corresponding to the tumor region or the other diseased tissue; and a combination device configured to:
  generate a combined tumor boundary based on the morphological tumor boundary and the spectral tumor boundary or generate a combined diseased tissue boundary based on the morphological diseased tissue boundary and the spectral diseased tissue boundary, and
  determine reliability of the combined tumor boundary by comparing the morphological tumor boundary and the spectral tumor boundary or determine reliability of the combined diseased tissue boundary by comparing the morphological diseased tissue boundary and the spectral diseased tissue boundary.

10. The medical image classification system according to claim 9,
  wherein the spectral image data is multispectral image data or hyperspectral image data.

11. The medical image classification system according to claim 9,
  wherein the morphological analysis and/or the spectral analysis of the spectral image data comprises processing of at least a portion of the spectral image data with a deep neural network or a machine learning algorithm or an artificial intelligence module.

12. The medical image classification system according to claim 9,
  wherein the spectral analysis of the spectral image data comprises classifying of a cluster of neighboring pixels as diseased or normal tissue.

13. The medical image classification system according to claim 9,
  wherein generating the combined tumor boundary comprises generating an indication of the reliability of the combined tumor boundary, or
  wherein generating the combined diseased tissue boundary comprises generating an indication of the reliability of the combined diseased tissue boundary.

14. The medical image classification system according to claim 13,
  wherein the system is configured to divide the spectral image into subparts, and
  wherein the indication of the reliability of the combined tumor boundary is based on a level of similarity of the morphological tumor boundary and the spectral tumor boundary in each subpart of the spectral image; or
  wherein the indication of the reliability of the combined diseased tissue boundary is based on a level of similarity of the morphological diseased tissue boundary and the spectral diseased tissue boundary in each subpart of the spectral image.

15. The medical image classification system according to claim 13,
  wherein the system is configured to present the indication of the reliability of the combined tumor boundary or the combined diseased tissue boundary in an image on an image display as color-coding.

16. The medical image classification system according to claim 13,
  wherein the system is configured to present the indication of the reliability of the combined tumor boundary or the combined diseased tissue boundary in an image on an image display as a line with variable thickness or structure.

17. The medical image classification system according to claim 16,
  wherein the system is configured to code the indication of the reliability of the combined tumor boundary or the combined diseased tissue boundary with a line having a thickness that corresponds to a confidence or an accuracy with which the combined tumor boundary or the combined diseased tissue boundary has been determined.

18. The medical image classification system according to claim 16,
  wherein the system is configured to provide a boundary with a highest level of confidence as a solid line and a boundary with a lower level of confidence as a dashed line.

19. The medical image classification system according to claim 9, wherein the morphological analysis includes selection of a wavelength band and performance of an intensity-based analysis of the hyper/multi-spectral image data in the selected wavelength band.

20. The medical image classification system according to claim 9, wherein the combination device is further configured to:
  (i) determine the reliability of the combined tumor boundary by:
    dividing the morphological tumor boundary into first subparts and the spectral tumor boundary into second subparts,
    determining a similarity level of the morphological tumor boundary and the spectral tumor boundary by computing a distance between the first subparts and the second subparts, and
    computing a confidence level of the combined tumor boundary based on the determined similarity level; or
  (ii) determine the reliability of the combined diseased tissue boundary by:
    dividing the morphological diseased tissue boundary into first subparts and the spectral diseased tissue boundary into second subparts,
    determining a similarity level of the morphological diseased tissue boundary and the spectral diseased tissue boundary by computing a distance between the first subparts and the second subparts, and
    computing a confidence level of the combined diseased tissue boundary based on the determined similarity level.

* * * * *